(12) United States Patent
Ootani

(10) Patent No.: US 11,420,324 B2
(45) Date of Patent: Aug. 23, 2022

(54) PARALLEL LINK ROBOT

(71) Applicant: FANUC CORPORATION, Yamanashi (JP)

(72) Inventor: Kentarou Ootani, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 92 days.

(21) Appl. No.: 16/853,813

(22) Filed: Apr. 21, 2020

(65) Prior Publication Data

US 2020/0376653 A1 Dec. 3, 2020

(30) Foreign Application Priority Data

May 27, 2019 (JP) .............................. JP2019-098409

(51) Int. Cl.
 *B25J 9/10* (2006.01)
 *B25J 9/00* (2006.01)
(52) U.S. Cl.
 CPC ............. *B25J 9/107* (2013.01); *B25J 9/0051* (2013.01)
(58) Field of Classification Search
 CPC ...... B25J 9/0051; B25J 9/107; B25J 17/0266; F16H 25/2018
 See application file for complete search history.

(56) References Cited

U.S. PATENT DOCUMENTS

| 4,776,749 | A | * | 10/1988 | Wanzenberg | ........ | B23Q 1/5462 |
| | | | | | | 29/39 |
| 5,231,888 | A | * | 8/1993 | Katahira | ............. | F16H 25/2018 |
| | | | | | | 74/89.3 |
| 5,715,729 | A | * | 2/1998 | Toyama | ............... | B23Q 1/5462 |
| | | | | | | 408/234 |
| 2004/0126198 | A1 | * | 7/2004 | Chen | .................... | B23Q 1/5462 |
| | | | | | | 409/201 |
| 2009/0301253 | A1 | | 12/2009 | Nishida et al. | | |
| 2010/0186534 | A1 | | 7/2010 | Kinoshita et al. | | |
| 2011/0097184 | A1 | | 4/2011 | Kinoshita et al. | | |
| 2011/0316467 | A1 | | 12/2011 | Nishida et al. | | |
| 2014/0331806 | A1 | * | 11/2014 | Nagatsuka | ............... | B25J 18/00 |
| | | | | | | 74/490.01 |

(Continued)

FOREIGN PATENT DOCUMENTS

EP 2 133 181 A2 12/2009
EP 2 669 064 A1 12/2013

(Continued)

*Primary Examiner* — Joseph Brown
(74) *Attorney, Agent, or Firm* — Maier & Maier, PLLC

(57) ABSTRACT

A parallel link robot includes: a base portion; a movable portion; arms that connect the base portion and the movable portion in parallel; base actuators that are disposed on the base portion and that drive the respective arms; an additional actuator that drives an additional mechanism portion attached to the movable portion; an auxiliary link that pivotally connects the additional actuator to at least one of the arms; and a power transmission shaft portion that transmits a rotational driving force of the additional actuator to the additional mechanism portion. Each of the arms includes a drive link and two passive links. The auxiliary link bridges the two passive links and is pivotally connected to each of the two passive links. The power transmission shaft portion includes a ball spline in which a spline shaft and a nut are meshed with each other.

5 Claims, 7 Drawing Sheets

(56) References Cited

U.S. PATENT DOCUMENTS

2018/0085913 A1* 3/2018 Ilch ...................... B25J 17/0266
2020/0147785 A1* 5/2020 Yamamoto ............. B25J 9/0051

FOREIGN PATENT DOCUMENTS

| JP | H09-001491 A | 1/1997 | | |
|---|---|---|---|---|
| JP | H11-303966 A | 11/1999 | | |
| JP | 2010-173019 A | 8/2010 | | |
| JP | 2010-188475 A | 9/2010 | | |
| JP | 4653848 B1 | 3/2011 | | |
| WO | WO-2010025471 A1 * | 3/2010 | ........... | B65G 47/086 |

* cited by examiner

PARALLEL LINK ROBOT

CROSS-REFERENCE TO RELATED APPLICATIONS

This application is based on Japanese Patent Application No. 2019-098409, the content of which is incorporated herein by reference.

FIELD

The present disclosure relates to a parallel link robot.

BACKGROUND

To date, there is a known parallel link robot including a base portion on which three motors are disposed, a movable portion disposed below the base portion, and three arms connected to the base portion and the movable portion in parallel with each other and respectively driven by the motors (for example, refer to The Publication of Japanese Patent No. 4653848). Each arm includes a drive link connected to the motor and two parallel passive links that connect the drive link and the movable portion to each other.

The movable portion is provided with an orientation changing mechanism that changes the orientation of an element attached to the movable portion. In addition, between the two passive links of one arm, an additional actuator disposed parallel to each passive link, and a power transmission shaft portion having a key shaft or a spline shaft that transmits a rotational driving force of the additional actuator to the orientation changing mechanism are attached. The additional actuator is supported by auxiliary links bridging the two passive links. In the power transmission shaft portion, a distal end of the key shaft or spline shaft is connected to an input shaft of the orientation changing mechanism via a universal joint.

The parallel link robot described in The Publication of Japanese Patent No. 4653848 is configured such that two quadrilaterals, which respectively have vertices at a bearing that connects the additional actuator to the auxiliary links, at bearings that connect the auxiliary links to the respective passive links, at bearings that connect the respective passive links to the movable portion, and at the universal joint, each form a parallelogram. In addition, the universal joint is disposed on a straight line that links the intersections of the two passive links and the movable portion to each other.

SUMMARY

One aspect of the present disclosure is directed to a parallel link robot including a base portion, a movable portion movable with respect to the base portion, a plurality of arms that connect the base portion and the movable portion in parallel, a plurality of base actuators that are disposed on the base portion and that drive the respective arms, an additional actuator that drives an additional mechanism portion attached to the movable portion, an auxiliary link that pivotally connects the additional actuator to at least one of the arms, and a power transmission shaft portion that transmits a rotational driving force of the additional actuator to the additional mechanism portion, in which each of the arms includes a drive link that is connected to a corresponding one of the base actuators and that has one degree of freedom with respect to the base portion, and two passive links that connect the drive link and the movable portion to each other and that are disposed parallel to each other, the auxiliary link bridges the two passive links and is pivotally connected to each of the two passive links, and the power transmission shaft portion includes a ball spline in which a spline shaft and a nut are meshed with each other, the spline shaft being fixed to one of a universal joint attached to an input shaft of the additional mechanism portion and an output shaft of the additional actuator, the nut being fixed to another one of the universal joint and the output shaft.

DETAILED DESCRIPTION OF EMBODIMENTS

A parallel link robot according to an embodiment of the present disclosure will be described below with reference to the drawings.

Figure 1:
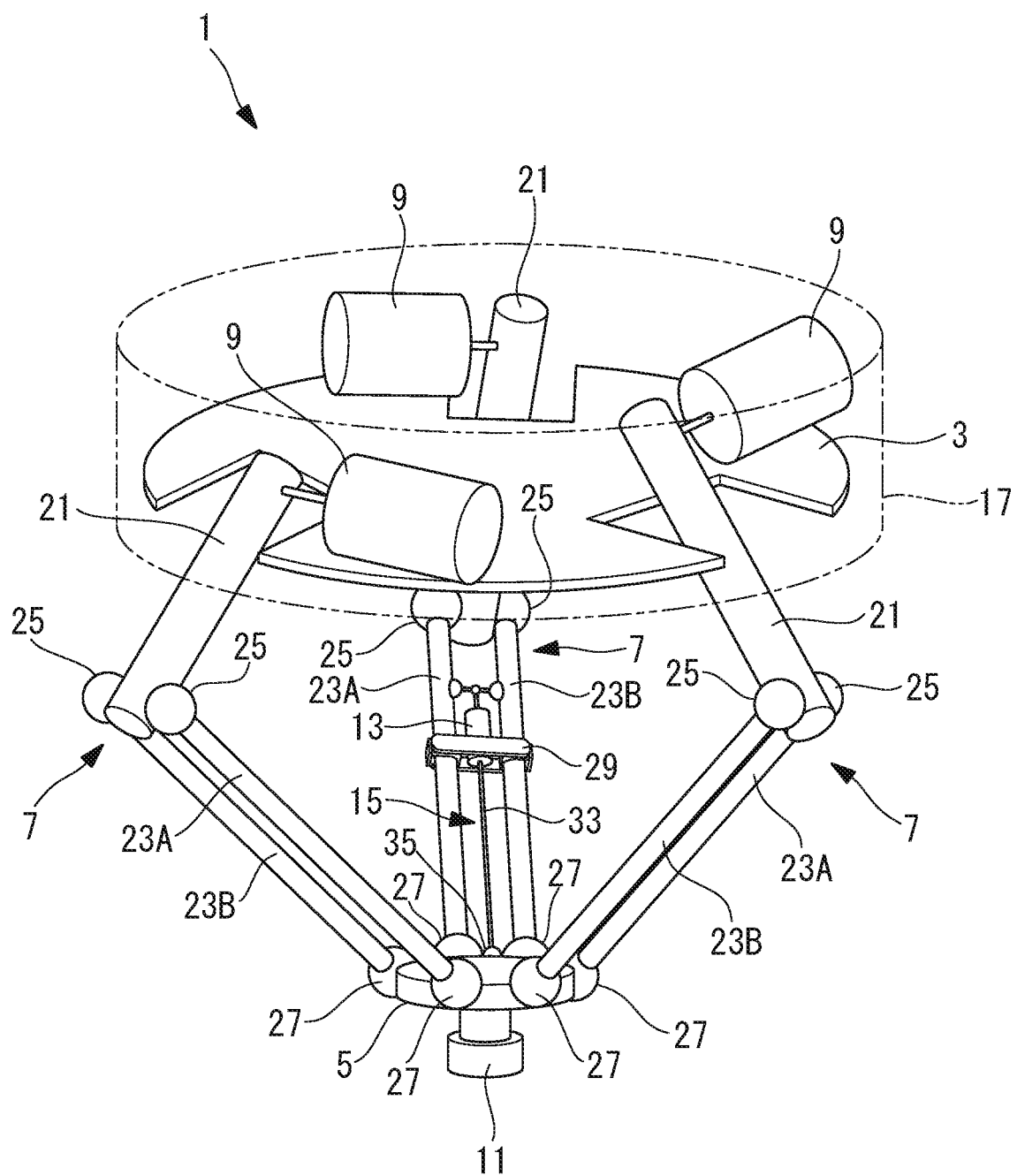
FIG. 1 is a perspective view illustrating a parallel link robot according to an embodiment of the present disclosure.

As illustrated in FIG. 1, a parallel link robot 1 according to the present embodiment includes a base portion 3 accommodated in a housing 17, a disk-shaped wrist portion (movable portion) 5 disposed below the base portion 3, a plurality of (for example, three) arms 7 that connect the base portion 3 and the wrist portion 5 in parallel, and three base actuators 9 that are fixed to the base portion 3 and that drive the three arms 7, respectively.

In addition, the parallel link robot 1 includes a wrist mechanism (additional mechanism portion) 11 provided on the wrist portion 5, an additional actuator 13 that drives the wrist mechanism 11, and a power transmission shaft portion 15 that transmits a rotational driving force of the additional actuator 13 to the wrist mechanism 11.

The housing 17 and the base portion 3 are members that are circular in plan view and that are fixed to an external structure (not illustrated) disposed above the parallel link robot 1.

The three base actuators 9 each include a servo motor and a reducer (not illustrated). The base actuators 9 are disposed at equal intervals in a circumferential direction around a center axis of the base portion 3. In addition, each of the base actuators 9 has a horizontal rotation drive shaft disposed along a tangential direction of a circle centered on the center axis of the base portion 3.

The three arms 7 are disposed at equal intervals in the circumferential direction around the center axis of the base portion 3. The three arms 7 each include a drive link 21 having one end fixed to the rotation drive shaft of a corresponding one of the base actuators 9, and two parallel passive links 23A and 23B connected between the other end of the drive link 21 and the wrist portion 5. The drive link 21 and the passive links 23A and 23B are connected by spherical bearings 25, and the passive links 23A and 23B and the wrist portion 5 are connected by spherical bearings 27.

The spherical bearings 25 and 27 provided at the two ends of each of the two passive links 23A and 23B of each of the arms 7 are disposed at positions where a quadrilateral having these four spherical bearings 25 and 27 as vertices forms a parallelogram. By controlling the three base actuators 9 individually, the wrist portion 5 can be translated to and positioned at a desired position in three dimensional directions including two horizontal directions and one vertical direction while maintaining the horizontal orientation.

Figure 2:
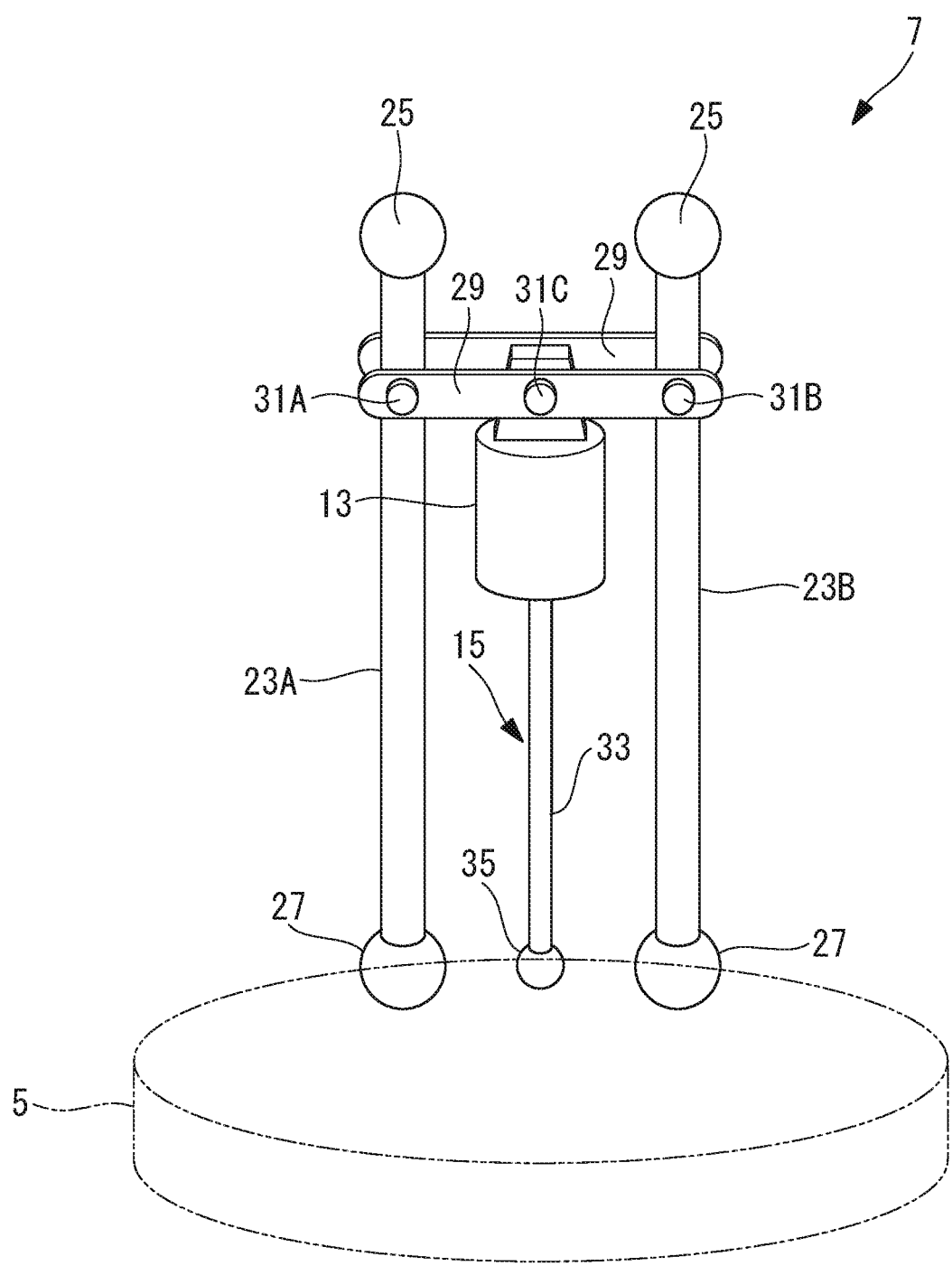
FIG. 2 is an enlarged view illustrating an auxiliary link and an additional actuator of the parallel link robot in FIG. 1.

As illustrated in FIG. 2, the two passive links 23A and 23B provided in one of the arms 7 are interconnected by an auxiliary link 29 disposed at a position in the longitudinal direction of the passive links 23A and 23B. The two ends of the auxiliary link 29 are respectively connected to the passive links 23A and 23B by bearings 31A and 31B so as to be rotatable about axes perpendicular to a plane including the longitudinal axes of the two passive links 23A and 23B.

Figure 3:
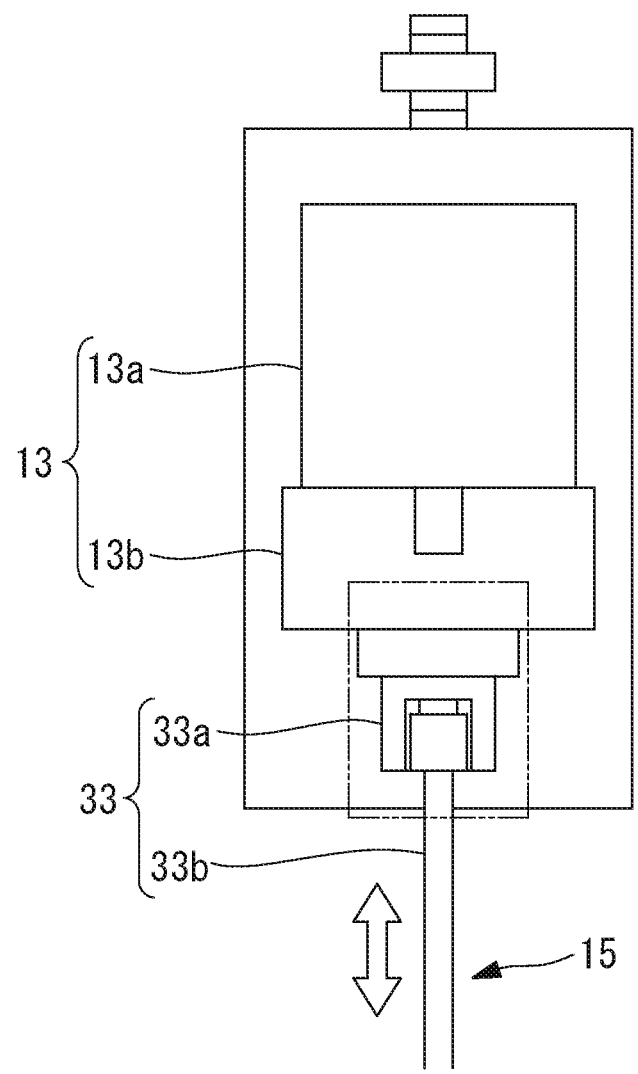
FIG. 3 is an enlarged view illustrating an additional actuator and a drive shaft in FIG. 1.

The additional actuator 13 is connected to the center of the auxiliary link 29 in the longitudinal direction by a bearing 31C so as to be rotatable about an axis parallel to the axes of the bearings 31A and 31B at the two ends of the auxiliary link 29. The additional actuator 13 includes, for example, a motor 13a and a reducer 13b, as illustrated in FIG. 3. In addition, the additional actuator 13 includes an output shaft rotatable about an axis parallel to the longitudinal direction of the passive links 23A and 23B.

Figure 4:
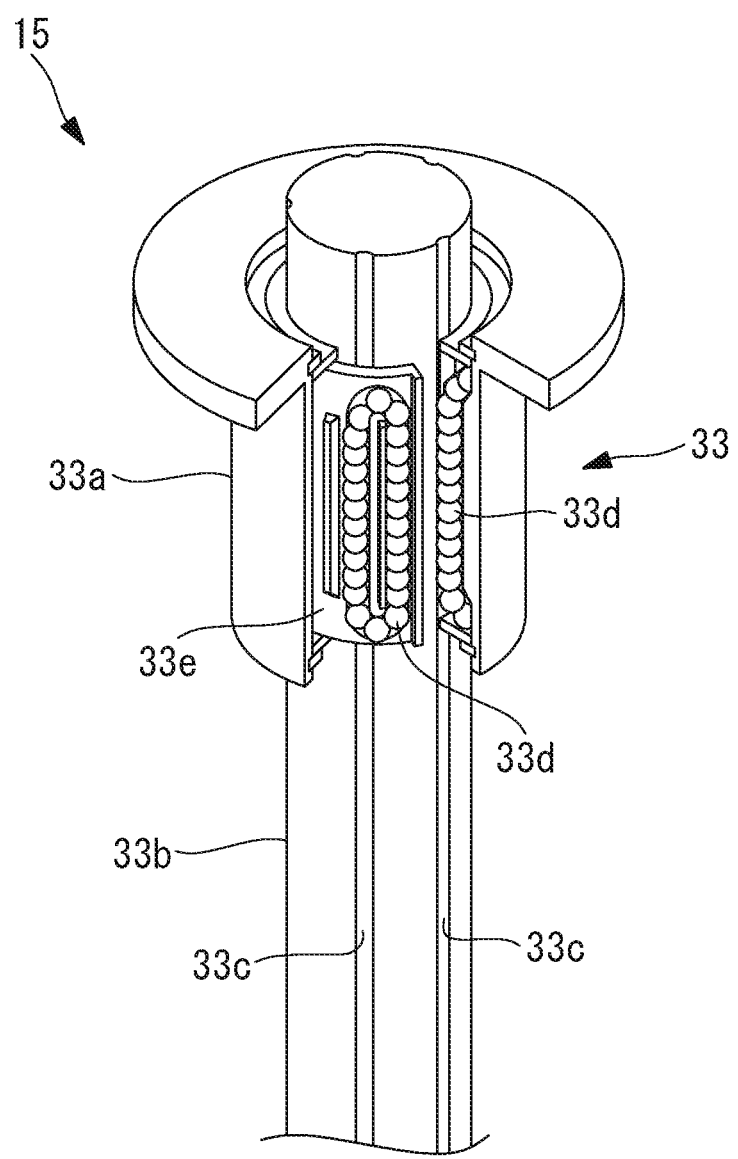
FIG. 4 is a schematic view illustrating the structure of the drive shaft in FIG. 3.
Figure 5:
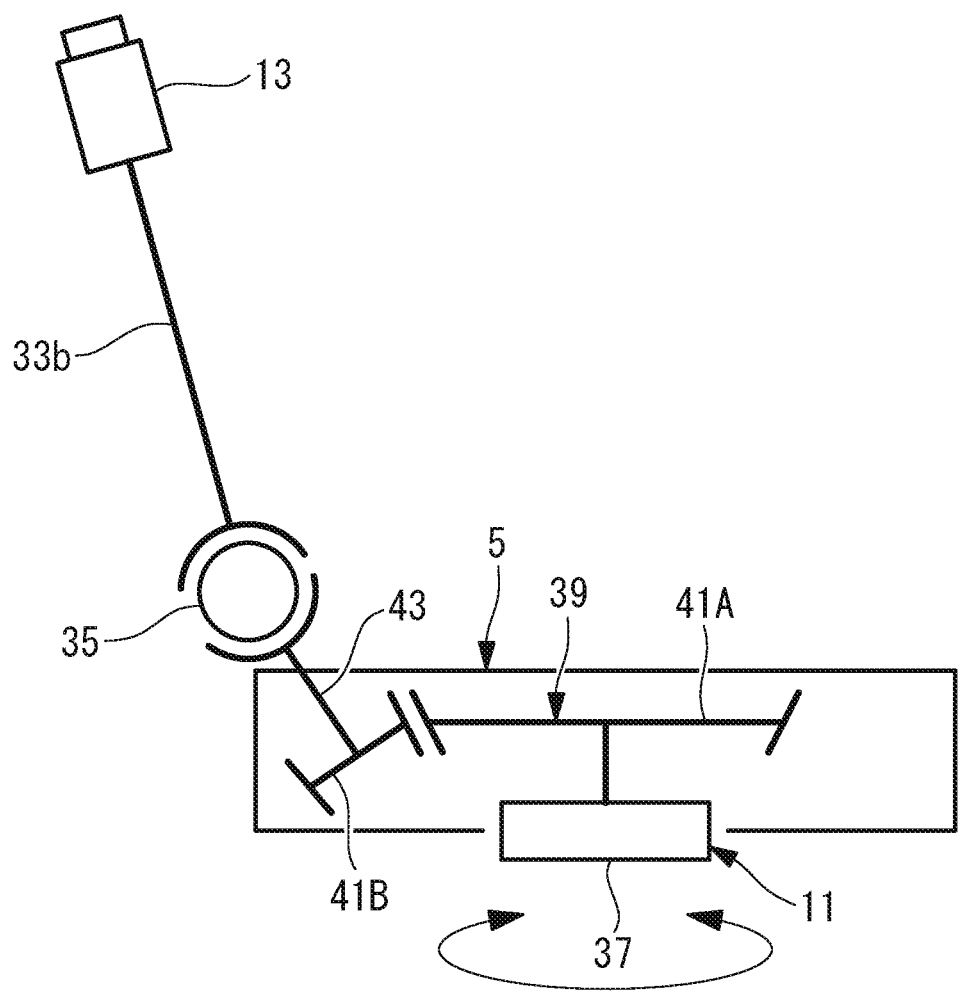
FIG. 5 is a schematic diagram illustrating a structure of a wrist mechanism of the parallel link robot in FIG. 1.

The power transmission shaft portion 15 includes a ball spline 33 as illustrated in FIGS. 3 to 5. The ball spline 33 includes a substantially cylindrical sleeve (nut) 33a fixed to the output shaft of the additional actuator 13, and a spline shaft (spline shaft) 33b fixed to a universal joint 35 attached to a shaft portion (input shaft) 43 of an orientation changing mechanism portion 39 described later, the sleeve (nut) 33a being meshed with the spline shaft (spline shaft) 33b. The sleeve 33a and the spline shaft 33b are provided with a plurality of transfer grooves 33c extending along their longitudinal directions, respectively. In FIG. 4, the transfer grooves of the sleeve 33a are not illustrated.

In addition, the ball spline 33 includes a plurality of load balls 33d and a retainer 33e that rotatably holds the load balls 33d between the sleeve 33a and the spline shaft 33b along the transfer grooves 33c of the sleeve 33a and the spline shaft 33b. In the ball spline 33, the plurality of load balls 33d roll along each of the transfer grooves 33c of the sleeve 33a and the spline shaft 33b, the spline shaft 33b slides smoothly in the axial direction with respect to the sleeve 33a, and the ball spline 33 can transmit torque while the spline shaft 33b is linearly moving.

As illustrated in FIG. 2, the output shaft of the additional actuator 13 and the ball spline 33 of the power transmission shaft portion 15, for example, extend between the two passive links 23A and 23B in parallel with the passive links 23A and 23B.

The center point of the universal joint 35 is disposed on a straight line linking the center points of the two spherical bearings 27 that connect the two passive links 23A and 23B and the wrist portion 5 to each other.

Regardless of the position of the wrist portion 5, the passive links 23A and 23B of the arm 7, the additional actuator 13, and the ball spline 33 are kept parallel to each other.

As illustrated in FIG. 5, the wrist mechanism 11 includes a disc-shaped attachment member (element) 37 rotatably supported by the wrist portion 5 about the center axis of the wrist portion 5, and the orientation changing mechanism portion 39 that drives the attachment member 37 so as to rotate about the center axis.

The orientation changing mechanism portion 39 includes a first gear 41A and a second gear 41B each formed of a bevel gear housed inside the wrist portion 5.

The first gear 41A is fixed to the attachment member 37, and is rotatably supported on the wrist portion 5 about the center axis of the attachment member 37.

The second gear 41B is disposed at a position where it meshes with the first gear 41A. The shaft portion 43 of the second gear 41B projects diagonally upward through the wrist portion 5, and is connected to the other end of the spline shaft 33b of the power transmission shaft portion 15 by the universal joint 35, as described above.

Next, the operation of the parallel link robot 1 according to the present embodiment will be described below.

According to the parallel link robot 1 having the above configuration, the three drive links 21 can be pivoted about the rotational drive axes of the respective base actuators 9 with one degree of freedom by driving the three base actuators provided on the base portion 3 fixed to the external structure.

When each of the drive links 21 is pivoted, the passive links 23A and 23B connected to the distal end of each of the drive links 21 by the spherical bearings 25 are passively pivoted while maintaining a parallel relationship between the drive link 21 and the wrist portion 5. Consequently, the wrist portion 5 can be moved with three degrees of freedom in two horizontal directions and one vertical direction, and can be positioned at a desired position.

In addition, by operating the additional actuator 13, the second gear 41B of the orientation changing mechanism portion 39 connected to the power transmission shaft portion 15 by the universal joint 35 meshes with the first gear 41A to transmit power to the attachment member 37, and the attachment member is rotated about the vertical axis with respect to the wrist portion 5. Consequently, the orientation of a tool (not illustrated) attached to the attachment member 37 can be changed about the vertical axis while the wrist portion 5, which has been positioned, remains fixed.

As illustrated in FIG. 1, because the spherical bearings 25 and 27 are respectively connected between each of the drive links 21 and two passive links 23A and 23B, and between each two passive links 23A and 23B and the wrist portion 5, the two passive links 23A and 23B of each of the arms 7 are always kept parallel regardless of the positions and orientations of the passive links 23A and 23B. In addition, as illustrated in FIG. 2, since the auxiliary link 29 and the passive links 23A and 23B are connected by the bearings 31A and 31B, and are connected to the auxiliary link 29 and the additional actuator 13 by the bearing 31C, and the ball spline 33 of the power transmission shaft portion 15 and the wrist portion 5 are connected by the universal joint 35, the additional actuator 13 also moves with the movement of the two passive links 23A and 23B.

In this case, when a dimensional error, mounting error, degradation, or the like occurs in the components forming a quadrilateral having the bearing 31C, the bearing 31A, a corresponding one of the spherical bearings 27, and the universal joint 35 as vertices, and a quadrilateral having the bearing 31C, the bearing 31B, a corresponding one of the spherical bearings 27, and the universal joint 35 as vertices, the distance between the auxiliary link 29 and the universal joint 35 changes as the orientation of the parallel link robot 1 changes when the parallel link robot 1 is being driven.

In the parallel link robot 1 according to the present embodiment, the spline shaft 33*b* smoothly slides in the axial direction with respect to the sleeve 33*a* while the rotational driving force of the additional actuator 13 is being transmitted to the wrist mechanism 11 by the ball spline 33 of the power transmission shaft portion 15. Consequently, in the power transmission shaft portion 15, a change in the distance between the auxiliary link 29 and the universal joint 35 can be allowed without causing wear due to friction between metals. Therefore, the processing accuracy and the assembly accuracy of the components forming the above-described quadrilateral can be reduced.

This embodiment can be modified to the following configuration.

Figure 6:
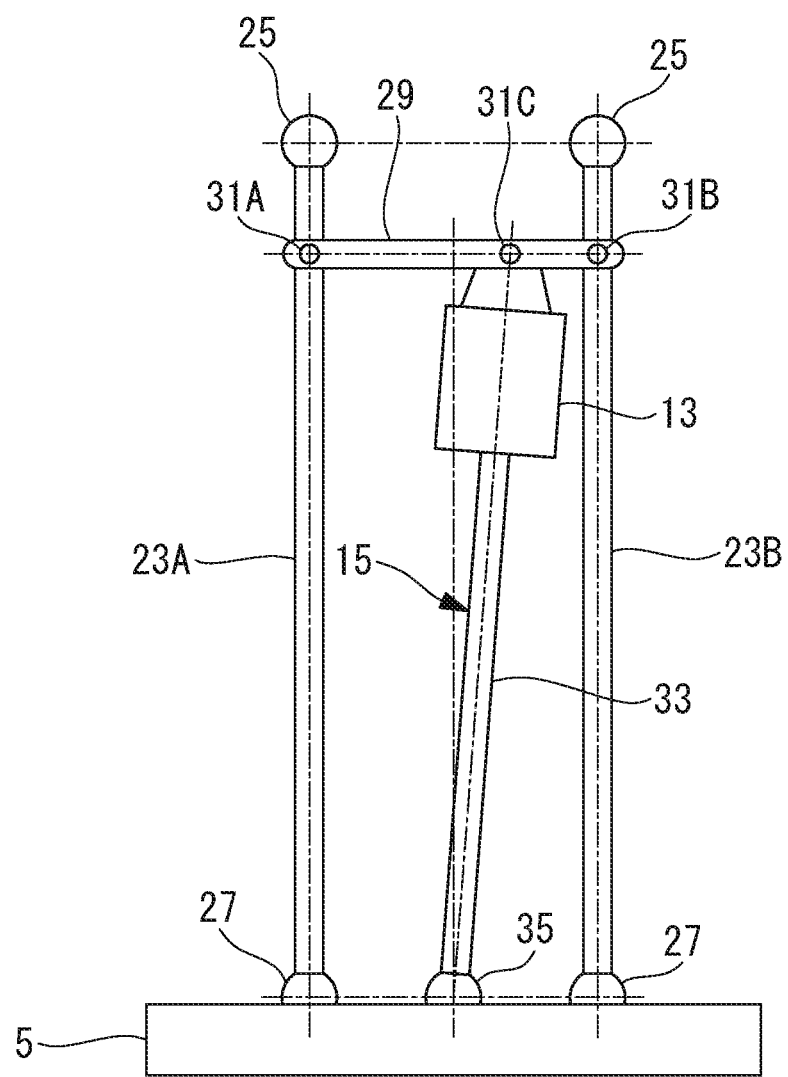
FIG. 6 is an enlarged view illustrating an additional actuator of a parallel link robot according to a first modification of the embodiment of the present disclosure.

In the present embodiment, the output shaft of the additional actuator 13 extends between the two passive links 23A and 23B and is parallel to the passive links 23A and 23B. As a first modification, for example, as illustrated in FIG. 6, the output shaft of the additional actuator 13 may be disposed so as to be inclined with respect to the longitudinal axes of the two passive links 23A and 23B.

According to the configuration of the present modification, the same effect as in the present embodiment can also be obtained by allowing for a change in the distance between the auxiliary link 29 and the universal joint 35 by means of the ball spline 33 of the power transmission shaft portion 15.

In addition, in the present embodiment, the center point of the universal joint 35 is disposed on a straight line linking the center points of the two spherical bearings 27 connecting the two passive links 23A and 23B and the wrist portion 5 to each other. As a second modification, for example, as illustrated in FIG. 7, the universal joint 35 may be disposed at a position offset from a straight line linking the intersections of the two passive links 23A and 23B and the wrist portion 5 in a direction intersecting a plane including the longitudinal axes of the two passive links 23A and 23B.

Figure 7:
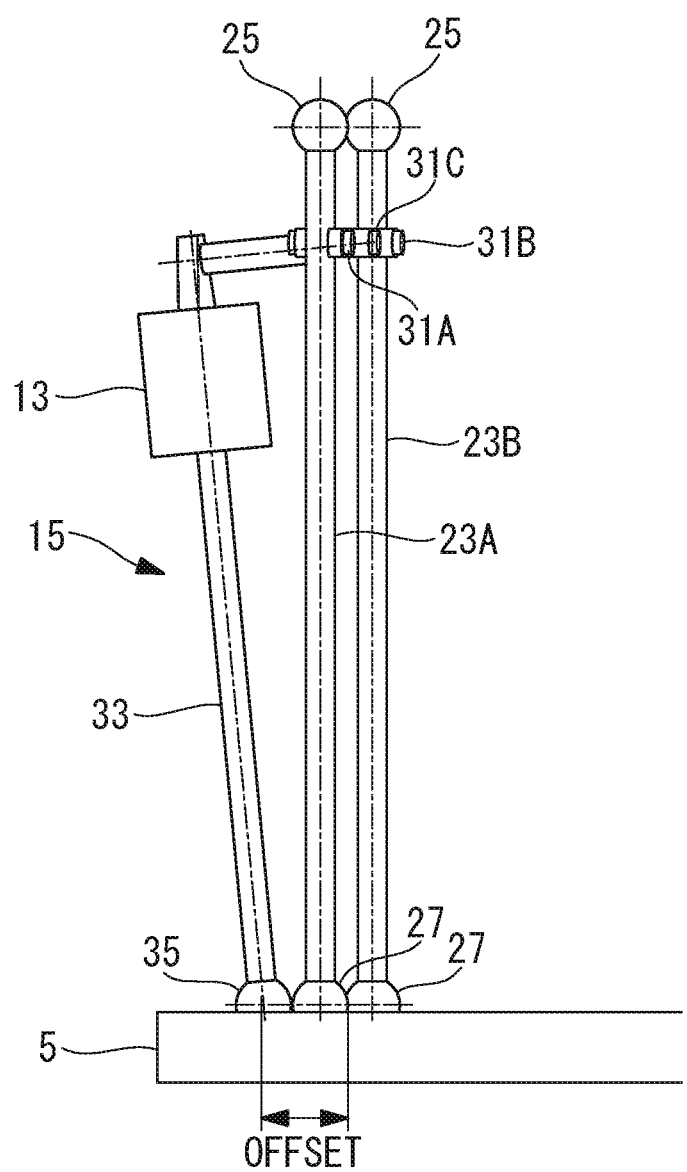
FIG. 7 is an enlarged view illustrating an additional actuator of a parallel link robot according to a second modification of the embodiment of the present disclosure.

In the example illustrated in FIG. 7, the rotation center of the universal joint 35 is disposed outside the wrist portion 5 with respect to the straight line linking the intersections of the two passive links 23A and 23B and the wrist portion 5. In addition, the additional actuator 13 is disposed outside the plane including the longitudinal axes of the two passive links 23A and 23B, that is, at a position shifted to the outside of the space formed by the three arms 7.

According to the configuration of the present modification, the same effect as in the present embodiment can also be obtained by allowing for a change in the distance between the auxiliary link 29 and the universal joint 35 by means of the ball spline 33 of the power transmission shaft portion 15. Furthermore, in the case where the passive links 23A and 23B have pivoted with respect to the drive links 21, because the additional actuator 13 is disposed at a position that is farther from the drive links 21 than are the two passive links 23A and 23B, interference between the drive links 21 and the additional actuator 13 can be avoided.

The configuration of the first modification and the configuration of the second modification may be combined.

In addition, in the present embodiment, the sleeve 33*a* of the ball spline 33 is fixed to the output shaft of the additional actuator 13, and the spline shaft 33*b* of the ball spline 33 is fixed to the universal joint 35. As a third modification, the spline shaft 33*b* may be fixed to the output shaft of the additional actuator 13, and the sleeve 33*a* may be fixed to the universal joint 35.

In addition, in the present embodiment, a delta-type parallel link robot 1 having three arms 7 is illustrated; instead of this, however, the present invention may be applied to another type of parallel link robot having two or more arms 7.

In addition, in the present embodiment, the case where the additional actuator 13 is attached to one arm 7 of the three arms 7 has been exemplified; instead of this, however, additional actuators 13 may be respectively attached to two arms 7 or all three arms 7.

When attaching the additional actuators 13 to respective ones of the two arms 7, for example, two second gears 41B meshing with the first gear 41A may be provided in the orientation changing mechanism portion 39, and each of the second gears 41B may be driven by respective additional actuators 13. Then, respective motors 13*a* of the two additional actuators 13 may be driven by the same torque command, and the two additional actuators 13 may be controlled by tandem control based on one torque command.

As a result, the two second gears 41B may both reliably mesh with the first gear 41A at the same time, and the driving torque of the first gear 41A can be reliably distributed by the two additional actuators 13.

When attaching the additional actuators 13 to the respective three arms 7, three second gears 41B may be simultaneously meshed with the first gear 41A, and the motors 13*a* of the three additional actuators 13 may be driven by the same torque command.

In addition, in the present embodiment, the case where the wrist mechanism 11 changes the orientation of the attachment member 37 about the vertical axis by means of the additional actuator 13 has been exemplified; instead of this, however, the present invention may be applied to a case where the orientation of the attachment member 37 is changed about the horizontal axis. In addition, the case where the wrist mechanism 11 has one degree of freedom has been exemplified; however, the present invention may be applied to a case where the wrist mechanism 11 has two degrees of freedom, and the orientation of the attachment member 37 based on either one of the degrees of freedom may be changed by the additional actuator 13.

In addition, in the present embodiment, the orientation changing mechanism portion 39 is given as an example of a structure in which the first gear 41A and the second gear 41B are meshed with each other; however, the present invention is not limited to this, and any other mechanism may be used. In addition, the first gear 41A and the second gear 41B are not limited to bevel gears.

The invention claimed is:

1. A parallel link robot comprising:
   a base portion;
   a movable portion that is movable with respect to the base portion;
   a plurality of arms that connect the base portion and the movable portion in parallel; a plurality of base actuators that are disposed on the base portion and drive respective arms; at least one additional actuator that drives an additional mechanism portion attached to the movable portion;
   an auxiliary link that pivotally connects the at least one additional actuator to at least one of the arms; and
   a power transmission shaft portion that transmits a rotational driving force of the at least one additional actuator to the additional mechanism portion;
   wherein each of the arms includes a drive link that is connected to a corresponding one of the base actuators and that has one degree of freedom with respect to the base portion, and two passive links that connect the drive link and the movable portion to each other and that are disposed parallel to each other, the auxiliary link bridges the two passive links and is pivotally connected to each of the two passive links, and the power transmission shaft portion includes a ball spline in which a spline shaft and a nut are meshed with each other, the spline shaft being fixed to a universal joint attached to an input shaft of the additional mechanism portion, the nut being fixed to an output shaft of the at least one additional actuator.

2. The parallel link robot according to claim 1, wherein the at least one additional actuator is disposed at an angle with respect to longitudinal axes of the two passive links.

3. The parallel link robot according to claim 1, wherein the universal joint is disposed at a position offset from a straight line linking intersections of the two passive links and the movable portion in a direction intersecting a plane including the longitudinal axes of the two passive links.

4. The parallel link robot according to claim 1, wherein the at least one additional actuator is a plurality of additional actuators, and wherein the additional mechanism portion is a first bevel gear which meshes with a second bevel gear corresponding to each of the plurality of additional actuators.

5. The parallel link robot according to claim 1, wherein the ball spline further comprises a retainer and a plurality of load balls which are held by the retainer between the spline shaft and the nut and guides the plurality of load balls along transfer grooves provided in both the spline shaft and the nut.

* * * * *